United States Patent
Wilms et al.

(10) Patent No.: US 12,273,595 B2
(45) Date of Patent: Apr. 8, 2025

(54) INTERACTIVE USER CONTENT PROVIDED VIA MULTIPLE USER DEVICES

(71) Applicant: GOOGLE LLC, Mountain View, CA (US)

(72) Inventors: Kurt Wilms, Mountain View, CA (US); Anish Kattukaran, Mountain View, CA (US); Lingxian Ding, Mountain View, CA (US); Amit Ghorawat, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/023,186

(22) PCT Filed: Aug. 10, 2022

(86) PCT No.: PCT/US2022/039937
§ 371 (c)(1),
(2) Date: Feb. 24, 2023

(87) PCT Pub. No.: WO2024/035400
PCT Pub. Date: Feb. 15, 2024

(65) Prior Publication Data
US 2024/0305863 A1  Sep. 12, 2024

(51) Int. Cl.
*H04N 21/478* (2011.01)
*H04N 21/41* (2011.01)
(Continued)

(52) U.S. Cl.
CPC ....... *H04N 21/478* (2013.01); *H04N 21/4126* (2013.01); *H04N 21/433* (2013.01); *H04N 21/8173* (2013.01)

(58) Field of Classification Search
CPC ............ H04N 21/478; H04N 21/4126; H04N 21/433; H04N 21/8173; H04N 21/4725; H04N 21/812; H04N 21/41265
(Continued)

(56) References Cited

U.S. PATENT DOCUMENTS 8,352,980 B2    1/2013  Howcroft
8,868,689 B1 *  10/2014 Khanna ............ H04N 21/25833
                                                 709/219
(Continued)

FOREIGN PATENT DOCUMENTS

JP   2021-170390 A   10/2021
TW   I542209 B        7/2016
(Continued)

OTHER PUBLICATIONS

International Search Report and Written Opinion for Application No. PCT/US2022/039937, dated Apr. 12, 2023.
(Continued)

*Primary Examiner* — Adil Ocak
(74) *Attorney, Agent, or Firm* — MARSHALL, GERSTEIN & BORUN LLP

(57) ABSTRACT

Techniques for initiating download of content are provided, including receiving, by one or more processors of the mobile computing device, an indication of a selection, made by a user of the mobile computing device, associated with third-party content provided by a proximate media player device; identifying, by the one or more processors of the mobile computing device, an indication of downloadable content associated with the third-party content displayed by the media player device; and downloading, by the one or more processors of the mobile computing device, in response to receiving the indication that the user selected the icon and
(Continued)

without further input from the user, the downloadable content to a memory of the mobile computing device.

16 Claims, 10 Drawing Sheets

(51) Int. Cl.
*H04N 21/433* (2011.01)
*H04N 21/81* (2011.01)

(58) Field of Classification Search
USPC .......................................................... 725/37
See application file for complete search history.

(56) References Cited

U.S. PATENT DOCUMENTS

| | | | |
|---|---|---|---|
| 8,918,333 B2* | 12/2014 | Harb | G06Q 30/0277 725/42 |
| 10,142,699 B2 | 11/2018 | Bunner | |
| 10,353,686 B1 | 7/2019 | Pasha et al. | |
| 10,949,875 B2 | 3/2021 | Niemeijer et al. | |
| 11,095,952 B2 | 8/2021 | Shkedi et al. | |
| 2013/0174191 A1* | 7/2013 | Thompson, Jr. | H04N 21/47815 725/23 |
| 2017/0098254 A1* | 4/2017 | Wickramasuriya | G06Q 30/0277 |
| 2021/0321166 A1 | 10/2021 | Jeong et al. | |

FOREIGN PATENT DOCUMENTS

| | | |
|---|---|---|
| WO | WO-2001/082201 A2 | 11/2001 |
| WO | WO-2014/186724 A1 | 11/2014 |

OTHER PUBLICATIONS

"Can interactive TV and advertising find an audience?," Fierce Video (2018). Retreived from the Internet at: URL:Can_Interactive_TV_and_advertising_find_an_audience?
"Clickable TV AdTech Will Change Everything We Know About TV Ads," Yahoo (2020). Retreived from the Internet at: URL:https://www.yahoo.com/now/clickable-tv-adtech-change-everything-042000181.html.
"Gatewaygo," Disney Advertising (2023). Retreived from the Internet at: URL:https://hulu.disneyadvertising.com/ad-products/gatewaygo/.
"How Baskin Robbins Made Interactive Coupon Offers," Roku Advertising (2023). Retreived from the Internet at: URL:How_Baskin_Robbins_Made_Interactive_Coupon_Offers.
"Zeebox Debuts SpotSynch: The World's First Instant Clickable TV Ads," Businesswire (2013). Retreived from the Internet at: URL:https://www.businesswire.com/news/home/20130212005984/en/zeebox-Debuts-SpotSynch-The-World%E2%80%99s-First-Instant-Clickable-TV-Ads.
Gold, "Interactive TV Ads: Real-Life Examples," (2010) Retreived from the Internet at: URL:https://www.clickz.com/interactive-tv-ads-real-life-examples/78448/>.
Perez "A new YouTube feature will make its connected TV ads more shoppable," TechCrunch (2021). Retreived from the Internet at: URL:https://techcrunch.com/2021/05/04/a-new-youtube-feature-will-make-its-connected-tv-ads-more-shoppable/?guccounter=1&guce_referrer=aHR0cHM6Ly93d3cuZ29vZ2xlLmNvbS8&guce_referrer_sig=AQAAAJqrQekA4ICDcOR0D1pRINthl7V8yDHWHjpgUzNZz-igiQV-0ZQgvNAgDpekoHI8zB5EpshSaiYuw7hYRShUVyH8t6cE4kRW4UIQBPEHSHGcLgBFxdCybwKikXTUa4hEf1JX3DYwzChi_BLftChvTopY0IUX5S-tX3EAmICYD9uw.
Notice of Refusal for Japanese Application No. 2023-541342, dated Oct. 28, 2024.

* cited by examiner

INTERACTIVE USER CONTENT PROVIDED VIA MULTIPLE USER DEVICES

CROSS-REFERENCE TO RELATED APPLICATIONS

This application is a U.S. national stage application, filed under 35 U.S.C. § 371, of International Patent Application No. PCT/US2022/39937, filed Aug. 10, 2022, the disclosure of which is incorporated by reference herein in its entirety.

FIELD OF THE DISCLOSURE

The present disclosure generally relates to content provided via media player devices and, more particularly, to interactive content provided via media player devices as well as other user devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, various electronic devices can present interactive content, but some of these devices can provide only limited interactivity to users. For example, television sets can receive a limited set of commands from a remote control unit, whereas a smartphone can execute numerous software applications and provide a rich interactive experience.

Examples of such interactive content include links to software downloadable to a smartphone. For instance, a digital media player such as a connected television (CTV) device can display streaming content from a certain content provider (e.g., a video streaming service) as well as third-party content that includes a description of software executable on a smartphone.

SUMMARY

In an embodiment, a method for initiating download of content is provided, the method implemented in a mobile device and comprising: receiving, by one or more processors of the mobile computing device, an indication of a selection, made by a user of the mobile computing device, associated with third-party content provided by a proximate media player device; identifying, by the one or more processors of the mobile computing device, an indication of downloadable content associated with the third-party content displayed by the media player device; and downloading, by the one or more processors of the mobile computing device, in response to receiving the indication that the user selected the icon and without further input from the user, the downloadable content to a memory of the mobile computing device.

In another embodiment, a method of initiating download of content is provided, the method implemented in a server and comprising: receiving, by one or more processors of the server, from a media player device, an indication of a selection made by a user, associated with third-party content displayed by the media player device; identifying, by the one or more processors of the server, a mobile computing device associated with the user and proximate to the media player device; identifying, by the one or more processors of the server, downloadable content associated with the third-party content provided by the media player device; sending, by the one or more processors of the server, to the mobile computing device, an indication of downloadable content associated with the third-party content provided by the media player device; and receiving, by the one or more processors of the server, an indication that the mobile computing device has downloaded the downloadable content.

In still another embodiment, a system for initiating download of content is provided, the system comprising one or more processors and a memory storing computer-readable instructions that, when executed by the one or more processors, cause the one or more processors to: receive an indication of a selection, made by a user of a mobile computing device, associated with third-party content provided by a proximate media player device; identify an indication of downloadable content associated with the third-party content displayed by the media player device; and download, in response to receiving the indication that the user selected the icon and without further input from the user, the downloadable content to a memory of the mobile computing device.

DETAILED DESCRIPTION

Overview

Figure 1:
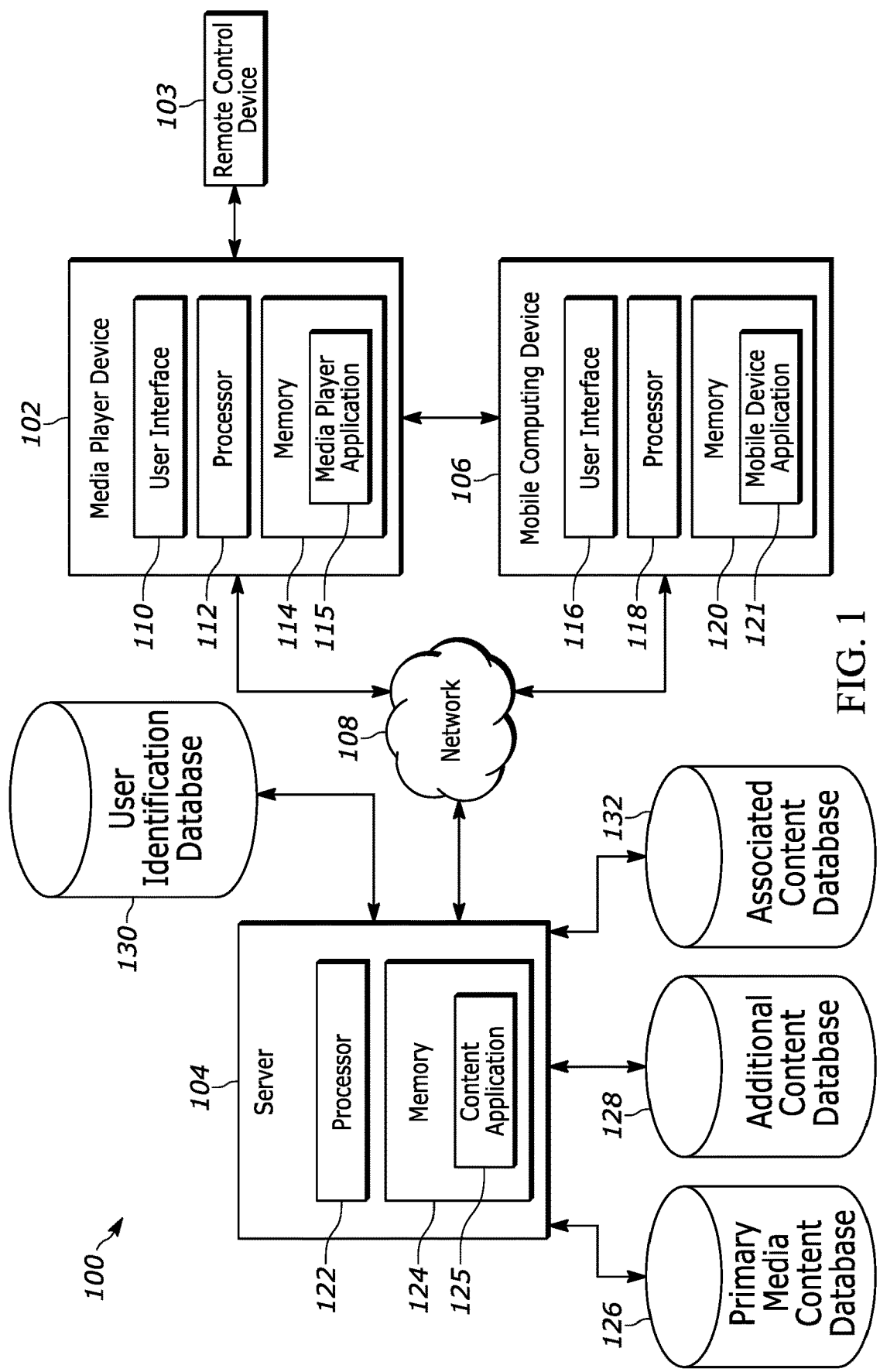
FIG. 1 illustrates a block diagram of an example system that implements techniques of this disclosure for providing interactive content via multiple user devices.

The present disclosure provides techniques for providing interactive third-party content via media player devices (such as CTV devices) that include selectable icons or buttons that, when selected by a user, result in action or activity at the user's mobile device, such as clicking on a link, downloading an application or other content item, visiting an online store or directly completing a purchase, displaying/viewing third-party content, etc.

Interactive third-party content can include a direct-response advertisement, which is a form of advertising where an advertiser pays for a specific, measurable action or activity, rather than an impression or view (i.e., a proxy). For instance, the specific, measurable action or activity may be clicking a link, purchasing or otherwise downloading an application or other content item. Measuring interaction with such content is challenging when the advertisement is served via a CTV device, because CTV devices typically do not include a web browser or mobile "app store", so the user cannot be directed to a web browser to complete an action such as clicking a link or purchasing or downloading an application or other content item. The system of this disclosure eliminates the need for a CTV device to support a web browser or provide similar functionality and, on the other hand, supports quantitative assessments of how users interact with third-party content presented via a CTV device by automatically directing the third-party content, or further content related to the third-party content presented via the CTV device, to another platform.

Still further, the techniques of this disclosure allow a system to automatically identify related events occurring on different, independent platforms. For example, when the user interacts with certain third-party content via a CTV device, and then the user further interacts with this or related third-party content via a mobile device by activating a link included in the third-party content, installing an application, etc., the system can automatically determine that these events are related by comparing the amount of time that elapsed between the two interactions, for example, or by comparing identifiers or keys associated with the versions of third-party content displayed via a CTV device and the smartphone. In at least some of the implementations, users indicate their preference for the system to coordinate selection of, and interaction with, third-party content between a CTV device and a mobile device by operating certain controls and/or installing certain applications.

In one example, when a user selects an icon that is part of an advertisement for a mobile device application via a media player device (e.g., using a remote control associated with the media player device), the media player device identifies a mobile computing device associated with the user and sends an indication that the icon has been selected to the user's mobile computing device, causing the mobile computing device to automatically download the application. In another example, when a user selects an icon that is part of an advertisement on the media player device (e.g., using a remote control associated with the media player device), the media player device identifies a mobile computing device associated with the user and sends the mobile computing device a unique user-specific link to content associated with the advertisement. In still another example, when a mobile device user watching an advertisement on a media player device has a content viewing application open on his or her mobile computing device, the media player device may send an indication of which advertisement is being displayed to the user's mobile computing device, which may in turn identify related content to provide to the user via the content viewing application.

In various implementations or scenarios, the mobile device can receive a copy of the third-party content which the user selected via the media player device, or content related to the third-party content which the user selected via the media player device. For example, the content which the server provides to the mobile device can be an expanded version of the advertisement displayed via the media player device.

Depending on the implementation or scenario, the media player device can send the indication directly to the user's mobile computing device via a short-range communication link such as a link of a wireless personal area network (WPAN) or an infrared data association (IrDA) link, or a wireless local area network (WLAN), or indirectly via a server. In the latter case, the media player device can notify a remote server that the user's mobile computing device is proximate to (e.g., is within a certain geofence of) the media player device, and the remote server can send a corresponding notification to the user's mobile device.

Example System

FIG. 1 is a block diagram of a system 100, in accordance with some examples provided herein. The high-level architecture illustrated in FIG. 1 may include both hardware and software applications, as well as various data communications channels for communicating data between the various hardware and software components, as is described below.

The system 100 may include a media player device 102 (such as, e.g., a connected or "smart" television (TV) device), a remote control device 103 associated with the media player device 102, a server 104, and a mobile computing device 106 (such as, e.g., a smart phone, tablet, smart watch, laptop computer, other personal computer, etc.) proximate to the media player device 102, configured to communicate with one another, e.g., via a network 108, which may include a local wireless network.

The media player device 102 may include a user interface 110 (e.g., a display screen) configured to provide content and information to users and/or receive input from users, one or more processors 112, and a memory 114 (e.g., volatile memory, non-volatile memory). The memory 114 may be accessible by the one or more processors 112 (e.g., via a memory controller). The one or more processors 112 may interact with the memory 114 to obtain, for example, computer-readable instructions stored in the memory 114. The computer-readable instructions stored in the memory 114 may cause the one or more processors 112 to execute one or more applications, including a media player application 115. Furthermore, in some examples, the computer-readable instructions stored on the memory 114 may include instructions for carrying out any of the steps of the method 300, described in greater detail below with respect to FIG. 3.

Executing the media player application 115 may include requesting and/or otherwise receiving primary content, as well as third-party content, from the server 104 (or, in some examples, multiple servers), and providing the primary media content, as well as the third-party content, to users via the user interface 110. For example, the primary media content may include streamed content, such as streamed TV programs and/or other video content, or streamed music and/or other audio content, as well as game content, in some examples. The third-party content may include, e.g., informational content, advertisement content, etc. Moreover, executing the media player application 115 may include providing interactive third-party content, i.e., third-party content that is selectable by users of the media player device 102, or third-party content that includes portions that are selectable by users of the media player device 102. In some examples, executing the media player application 115 may include providing items of third-party content that include a selectable icon, button, or other control element via which a user may indicate a selection associated with a particular item of third-party content. In some examples, executing the media player application 115 may include receiving indications of selections associated with third-party content by users of the media player device 102, e.g., via the user interface 110 of the media player device 102 (e.g., via a tactile/haptic input, via voice command, etc.), via a separate remote control device 103, or via the mobile computing device 106.

Upon receiving an indication of a user selection associated with a particular item of third-party content by a user of the media player device 102, the media player application 115 may send an indication of the user selection associated with the particular item of third-party content to the server 104. The indication of the user selection sent to the server 104 by the media player application 115 may include an identification of a particular item of third-party content selected by the user, as well as an identification of the user or a mobile computing device 106 associated with the user.

For instance, in some examples, executing the media player application 115 may include requiring users to sign in, and may identify the user who selected the item of third-party content based on identifying a user name or other identification (e.g., login credentials) of the signed-in user at the time of the selection of the item of third-party content. Moreover, in some examples, executing the media player application 115 may include identifying the mobile computing device 106 of the user who selected the item of third-party content based on the mobile computing device 106. For instance, executing the media player application 115 may include identifying a mobile computing device 106 via which the selection of the item of third-party content was received (i.e., a mobile computing device 106 via which the media player device 102 received a signal indicating the selection of the item of third-party content). As another example, executing the media player application 115 may include identifying a mobile computing device 106 proximate to the media player device 102 at the time of the selection of the item of third-party content. For instance, the media player application 115 may determine that the mobile computing device 106 is proximate to the media player device 102 based on the media player device 102 receiving a short-range signal (e.g., a Bluetooth™ signal) from the mobile computing device.

Additionally, in some examples, upon receiving an indication of a user selection associated with a particular item of third-party content by a user of the media player device 102, the media player application 115 may send an indication of the user selection associated with the particular item of third-party content to the server 104, and the media player device 102 may subsequently receive content associated with the third-party content from the server 104 based on the user selection associated with the particular item of third-party content. For instance, the associated content may be application content accessible by the media player application 115 or by other applications of the media player device 102, such as indications of subscriptions to certain television streaming channels, or items of primary content including movies, television programs, or other audio or video content.

Further, the media player application 115 (or, more generally, the media player device 102) can indicate to the server 104 which primary content the media player device 102 displayed when the user made a selection of third-party content. In this manner, the server 104 can make a correct attribution of user interaction with the third-party content via the mobile device 106. The server 104 can log for example the event E corresponding to the user clicking on, or otherwise interacting with, third-party content C displayed via the user interface of the media player device 102 at time $t_1$. Even if the user further interacts with related content C' via the mobile device 106 at time $t_2$ relatively distant from time $t_1$ (e.g., an hour later), the server may store an indication that the mobile device 106 received content C' in response to the user interacting with content C via the media player device 12.

Turning now to the server 104, the sever 104 may include one or more processors 122 and a memory 124 (e.g., volatile memory, non-volatile memory). The memory 124 may be accessible by the one or more processors 122 (e.g., via a memory controller). The one or more processors 118 may interact with the memory 124 to obtain, for example, computer-readable instructions stored in the memory 124. The computer-readable instructions stored in the memory 124 may cause the one or more processors 122 to execute one or more applications, including a content application 125. Furthermore, in some examples, the computer-readable instructions stored on the memory 124 may include instructions for carrying out any of the steps of the method 400, described in greater detail below with respect to FIG. 4, and/or the method 500, described in greater detail below with respect to FIG. 5.

For instance, executing the content application 125 may include receiving requests for primary and/or third-party content from the media player device 102, and providing primary and/or third-party content to the media player device 102 in response to such requests, or otherwise. For example, the content application 125 may access a primary media content database 126 and/or a third-party content database 128, and may provide content from the databases 126, 128 to the media player device 102. Additionally, executing the content application 125 may include receiving, from the media player device 102, indications of selections made by users associated with third-party content provided by the media player device 102. Moreover, executing the content application 125 may include receiving, from the media player device 102, indications of user selections associated with third-party content provided by the media player device, as well as identifications of the users who make such selections associated with the third-party content. In some examples, executing the content application 125 may include identifying a respective mobile computing device 106 associated with each user who makes a selection associated with third-party content provided by the media player device 102.

For instance, in some examples, the server 104 may receive, from the media player device 102, indications of identifications of respective mobile computing devices 106 associated with users who make such selections associated with the third-party content provided by the media player device 102. Moreover, in some examples, the content application 125 may determine an identification of a mobile computing device 106 associated with an identified user, e.g., based on a user name or other identification (e.g., login credentials) of a signed-in user of the media player application 121 of the media player device 102 at the time of the selection of the item of third-party content. That is, the user name or other identification of the signed-in user of the media player application 121 may correspond to a particular mobile computing device 106, or may correspond to an application that is installed on a particular mobile computing device 106. In some examples, the content application 125 may access a user identification database 130, which may, for instance, indicate user names or other login credentials associated with various users, and identifications of their respective mobile computing devices 106. Moreover, a particular user may utilize common login credentials for the media player application 121 and an application installed on the mobile computing device 106.

Additionally, in some examples, the content application 125 may determine an identification of a mobile computing device 106 associated with an identified user based on receiving an indication of a location associated with the media player device 102 (e.g., from the media player device 102) and receiving an indication of a location associated with the mobile computing device 106 (e.g., from the mobile computing device 106). That is, the content application 125 may determine that the mobile computing device 106 is associated with an identified user who made a selection associated with third-party content provided by the media player device 102 based on the distance between the respective locations of the media player device 102 and mobile computing device 106, i.e., based on the distance being less than a threshold distance, indicating the proximity of the media player device and the mobile computing device 106.

Furthermore, executing the content application 125 may include identifying content associated with the selected third-party content provided by the media player device 102. For instance, the content application 125 may access an associated content database 132, which may store indications of content associated with the third-party content provided by the media player device 102, and/or content associated with particular selections users may make with respect to the third-party content provided by the media player device 102. Executing the content application 125 may include identifying items of associated content (e.g., stored in the associated content database 132) that are associated with particular selections made by users with respect to the third-party content provided by the media player device 102. That is, in some examples, a particular item of third-party content provided by the media player device 102 may correspond to a respective item of associated content. Moreover, in some examples, a particular selection that a user may make with respect to the third-party content provided by the media player device 102 may correspond to a respective item of associated content. In some examples, the indications of associated content stored in the associated content database 132 may include indications of mobile device applications, and/or particular items of application content accessible by particular mobile device applications, associated with respective items of third-party content provided by the media player device 102. In some examples, the mobile device applications may be mobile-only applications, i.e., applications that can only be downloaded and run on the mobile computing device 106, and not on the media player device 102, or applications that only be practically used the mobile computing device 106, and not on the media player device 102. Similarly, in some examples, the items of application content accessible by the mobile device applications may be items of application content for mobile-only applications, and may only be accessed by mobile-only applications but not applications of the media player device 102. Moreover, in some examples, the indications of associated content stored in the associated content database 132 may include indications of items of web content associated with respective items of third-party content provided by the media player device 102.

Executing the content application 125 may include providing indications of the identified associated content (and/or the associated content itself) to the identified mobile computing device 106. That is, in some examples, the content application 125 may send, to the mobile computing device 106, an indication of the identified associated content, e.g., an indication of an application, an indication of an item of application content, an indication of an item of web content, etc. In some examples, the content application 125 may generate a unique, user-specific manner of accessing the identified associated content, such as a unique, user-specific URL for accessing an item of web content, and may send the unique, user-specific manner of accessing the identified associated content to the mobile computing device 106. Additionally, in some examples, the content application 125 may send downloadable associated content (e.g., a downloadable application, a downloadable item of application content, a downloadable item of web content, etc.) to the mobile computing device 106. Executing the content application 125 may in turn include receiving indications, from the mobile computing device 106, that the associated content has been downloaded and/or accessed by the user of the mobile computing device 106. In some examples, the indication that the associated content has been downloaded and/or accessed by the user of the mobile computing device 106 may further include other characteristics of the downloading or accessing of the associated content by the mobile computing device. For instance, the content application 125 may receive an indication of a time at which the mobile computing device 106 downloaded or accessed the associated content or an indication of an amount of time for which the mobile computing device accessed the associated content. As another example, the content application 125 may receive an indication of any other actions the mobile computing device 106 performed related to the associated content, such as whether the user logged in to a downloaded application or logged in to a website related to the associated content, an indication of whether the user made a purchase via the associated content, etc.

Additionally, in some examples, the content application 125 may identify content associated with the selected third-party content that is accessible by the media player application 115 or other applications of the media player device 102, and may send such associated content to the media player device in response to receiving the indication that the user has made the selection associated with the third-party content. For instance, the content application 125 may identify indications of subscriptions to certain television streaming channels, or items of primary content including movies, television programs, or other audio or video content associated with the selected third-party content, and may send indications of this associated content or items of this associated content to the media player device 102.

Turning now to the mobile computing device 106, the mobile computing device 106 may include a user interface 116, one or more processors 118 and a memory 120 (e.g., volatile memory, non-volatile memory). The memory 120 may be accessible by the one or more processors 118 (e.g., via a memory controller). The one or more processors 118 may interact with the memory 120 to obtain, for example, computer-readable instructions stored in the memory 120. The computer-readable instructions stored in the memory 120 may cause the one or more processors 118 to execute one or more applications, including a mobile device application 121. Furthermore, in some examples, the computer-readable instructions stored on the memory 120 may include instructions for carrying out any of the steps of the method 600, described in greater detail below with respect to FIG. 6, and/or the method 700, described in greater detail below with respect to FIG. 7.

Executing the mobile device application 121 may include, in some examples, allowing a user to access content provided via the mobile device application 121 based on the user signing in to the mobile device application 121, or otherwise providing login credentials or other user identifying information to the mobile device application 121, which may in turn provide the login credentials or other user identifying information to the server 104. Moreover, in some examples, executing the mobile device application 121 may include providing additional information to the server 104, such as, for instance, an indication of the location of the mobile computing device 106.

In some examples, executing the mobile device application 121 may include receiving user inputs or selections associated with primary or third-party content provided by the media player device 102, and the mobile device application 121 may send indications of such selections directly to the media player device 102, or to the server 104 which may in turn send indications of such selections to the media player device 102. That is, in some examples, the user may control the media player device 102 via the user interface 116 of the mobile computing device 106.

Additionally, executing the mobile device application 121 may include receiving an indication (e.g., from the media player device 102, or from the server 104), that a user of the mobile computing device 106 has made a selection associated with the third-party content provided by a proximate media player device 102. Furthermore, executing the mobile device application 121 may include receiving, from the server 104, indications of content associated with the third-party content provided by the proximate media player device 102. The associated content may include items of web content, items of application content, and/or mobile device applications via which the items of application content may be accessed. In some examples, the mobile device applications may be mobile-only applications, i.e., applications that can only be downloaded and run on the mobile computing device 106, and not on the media player device 102. Similarly, in some examples, the items of application content accessible by the mobile device applications may be items of application content for mobile-only applications, and may only be accessed by mobile-only applications of the mobile computing device 106, but not by applications of the media player device 102.

In some examples, the mobile device application 121 may receive instructions or other information associated with accessing the associated content from the server 104, based on which the mobile device application 121 may request to download or otherwise access the associated content from the server 104 or from another server. Moreover, in some examples, the mobile device application 121 may receive the associated content itself from the server 104. In any case, the mobile device application 121 may download or otherwise access the identified associated content in response to receiving the indication that the user of the mobile computing device 106 has made a selection associated with the third-party content with which the content is associated. In some examples, the mobile device application 121 may determine whether another mobile device application is needed to access the associated content, and may initiate the downloading of the other mobile device application in response to receiving the indication that the user of the mobile computing device 106 has made a selection associated with the third-party content with which the content is associated.

Additionally, in some examples, the mobile device application 121 may determine whether a mobile device application to be used to access the associated content is currently running or currently open on the mobile computing device 106. The mobile device application to be used to access the associated content may access (e.g., open, activate, initiate, and/or begin playback, etc.) the associated content automatically (i.e., without further action from the user of the mobile computing device 106) in response to receiving the indication that the user of the mobile computing device 106 has made a selection associated with the third-party content with which the content is associated and in response to the mobile device application to be used to access the associated content is currently running or currently open when the user makes the selection. For example, when the associated content is video content to be played by a video player mobile device application, the video player mobile device application may begin playing the video content based on the user's selection and based on the fact that the video player mobile device application is running and/or open at the that the selection is made.

In particular, the mobile device application 121 may download the identified associated content to the memory of the mobile computing device 106, and/or access the identified associated content, without any further input from the user of the mobile computing device 106. Moreover, in some examples, the mobile device application 121 may download the identified associated content to the memory of the mobile computing device 106, and/or access the identified associated content, without any input provided via the mobile computing device 106 at any point in the process, i.e., when the user of the mobile computing device 106 makes the selection associated with the third-party content provided by the media player device 102 via a separate remote control device 103 or via a user interface of the media player device 102.

Furthermore, in some examples, upon downloading, accessing, or otherwise receiving the associated content, the mobile device application 121 may send an indication, e.g., to the server 104 or to another server. In some examples, the indication that the associated content has been downloaded, accessed, or otherwise received by the mobile computing device 106 may further include other characteristics of the downloading or accessing of the associated content by the mobile computing device. For instance, the mobile device application 121 may send an indication of a time at which the mobile computing device 106 downloaded or accessed the associated content or an indication of an amount of time for which the mobile computing device accessed the associated content. As another example, the mobile device application 121 may send an indication of any other actions the mobile computing device 106 performed related to the associated content, such as whether the user logged in to a downloaded application or logged in to a website related to the associated content, an indication of whether the user made a purchase via the associated content, etc.

Example User Interface Displays

FIGS. 2A-2F illustrate example user interface displays associated with techniques of this disclosure for providing interactive content via multiple user devices.

Figure 2A:
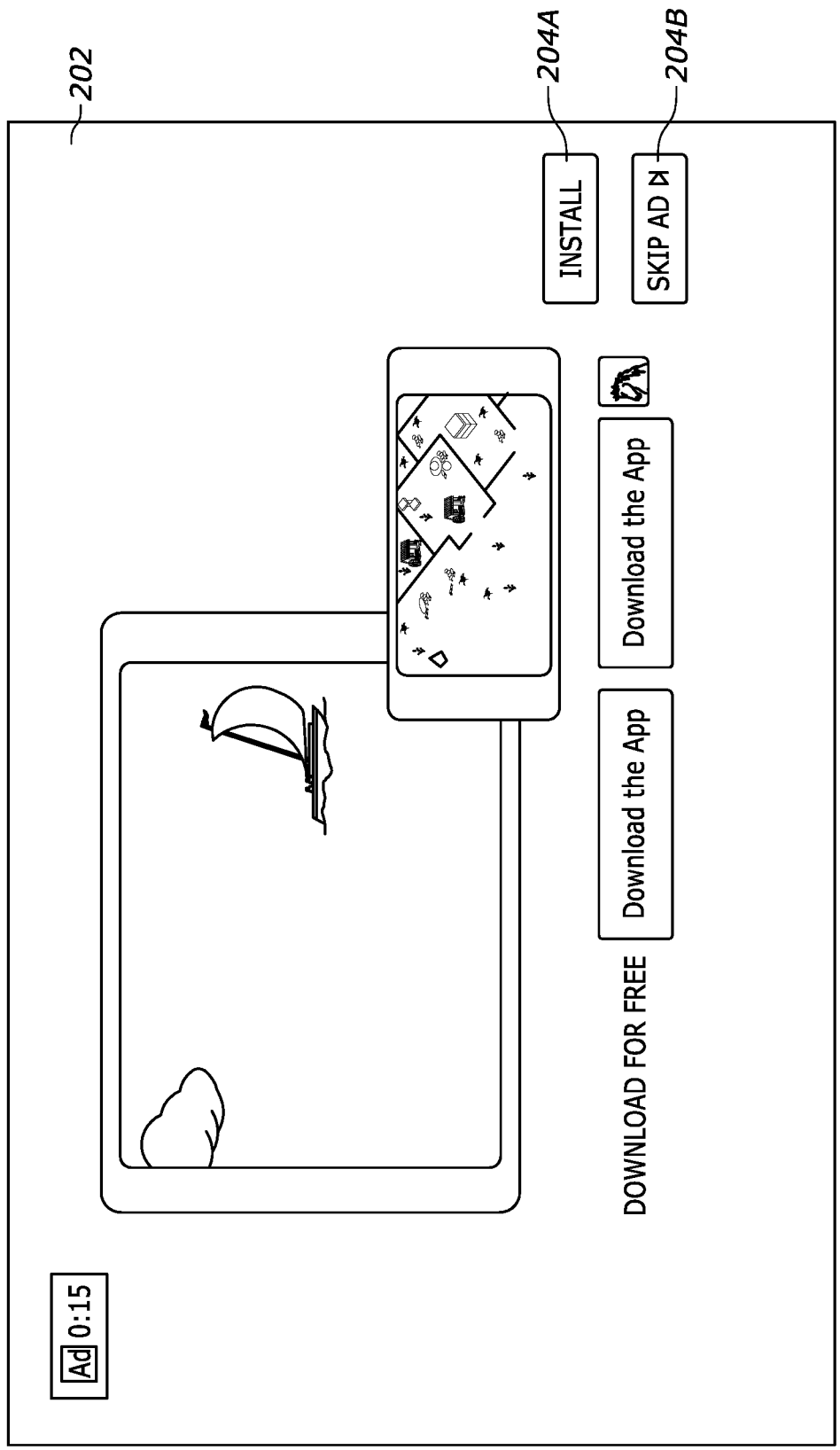
FIGS. 2A-2F illustrate example user interface displays associated with techniques of this disclosure for providing interactive content via multiple user devices.

For instance, as shown at FIG. 2A, the media player application 115 of the media player device 102 may provide third-party content 202 via the user interface 110 of the media player device 102. In the example of FIG. 2A, the third-party content 202 includes an advertisement for a mobile device application. The third-party content 202 may include various selectable portions or icons 204A and 204B. The selectable icon 204A is associated with installing the mobile device application via a mobile computing device 106 associated with the user, while the selectable icon 204B is associated with skipping the third-party content 202. While two such icons, 204A and 204B, are shown at FIG. 2A, in other examples more, or fewer, selectable icons may associated with the third-party content 202.

Figure 2B:
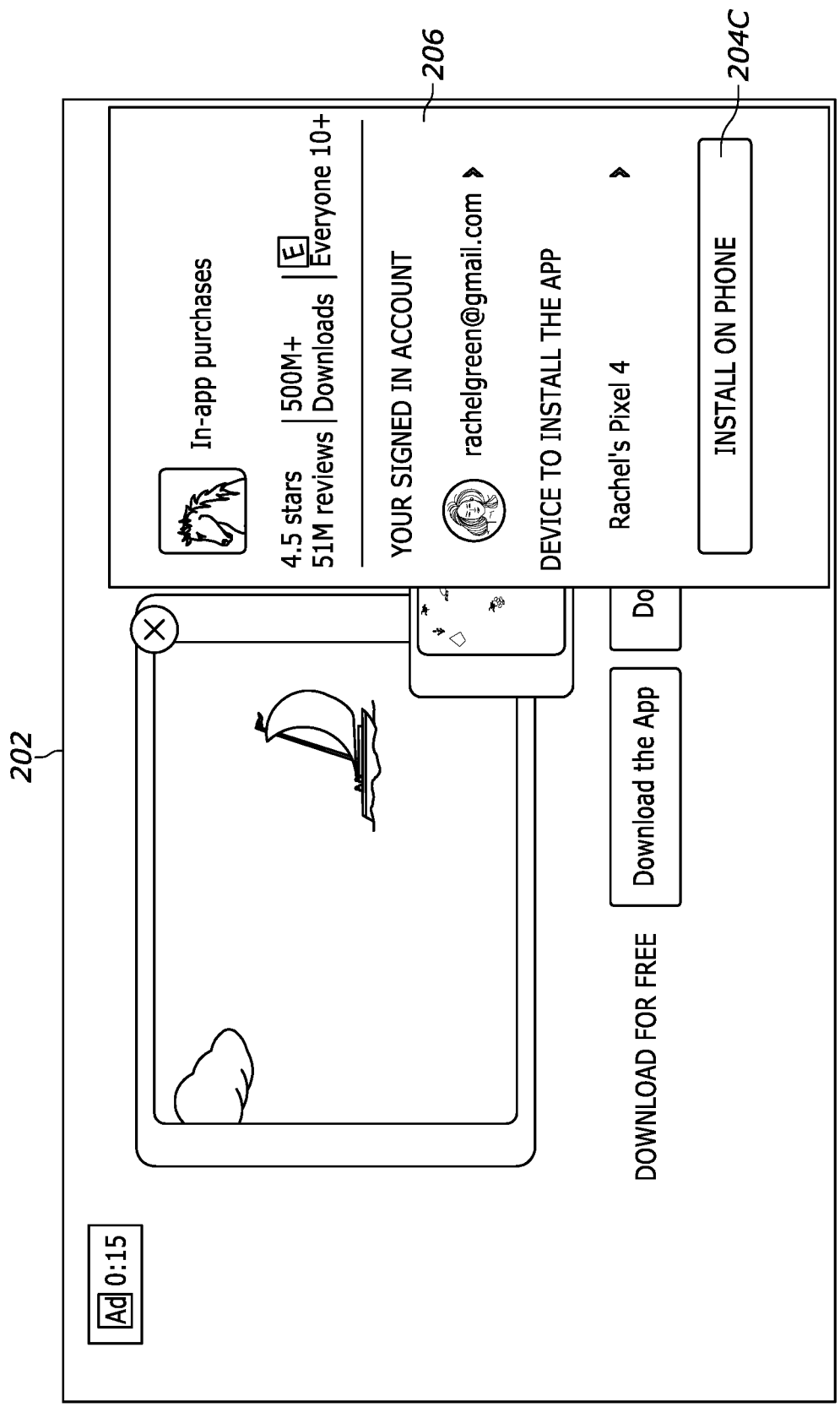

As shown at FIG. 2B, in response to a user selecting the selectable icon 204A, the media player application 115 may, in some examples, provide a confirmation window 206 including a confirmation of the user's login credentials for a signed-in account (e.g., "rachelgreen@gmail.com"), and a mobile computing device 106 (e.g., "Rachel's Pixel 4") associated with the user. The confirmation window 206 may include an additional selectable icon 204C associated with confirming that the mobile device application should be downloaded and installed on the mobile computing device 106 associated with the user. When a user selects the selectable icon 204C, the media player application 115 of the media player device 102 may send an indication of the selection (and an indication of the user's identification and/or identification of the user's mobile computing device 106) to the server 104, which may in turn send the mobile device application, or an indication identifying the mobile device application, to the mobile computing device 106 associated with the user. In some examples, the mobile computing device 106 may download and/or install the mobile device application without any additional input from the user. That is, in some examples, the mobile computing device 106 may download and/or install the mobile device application sent by and/or identified by the server 104 without any user input being provided via the mobile computing device 106 itself (i.e., based only on user input provided via the media player device 102).

Figure 2C:
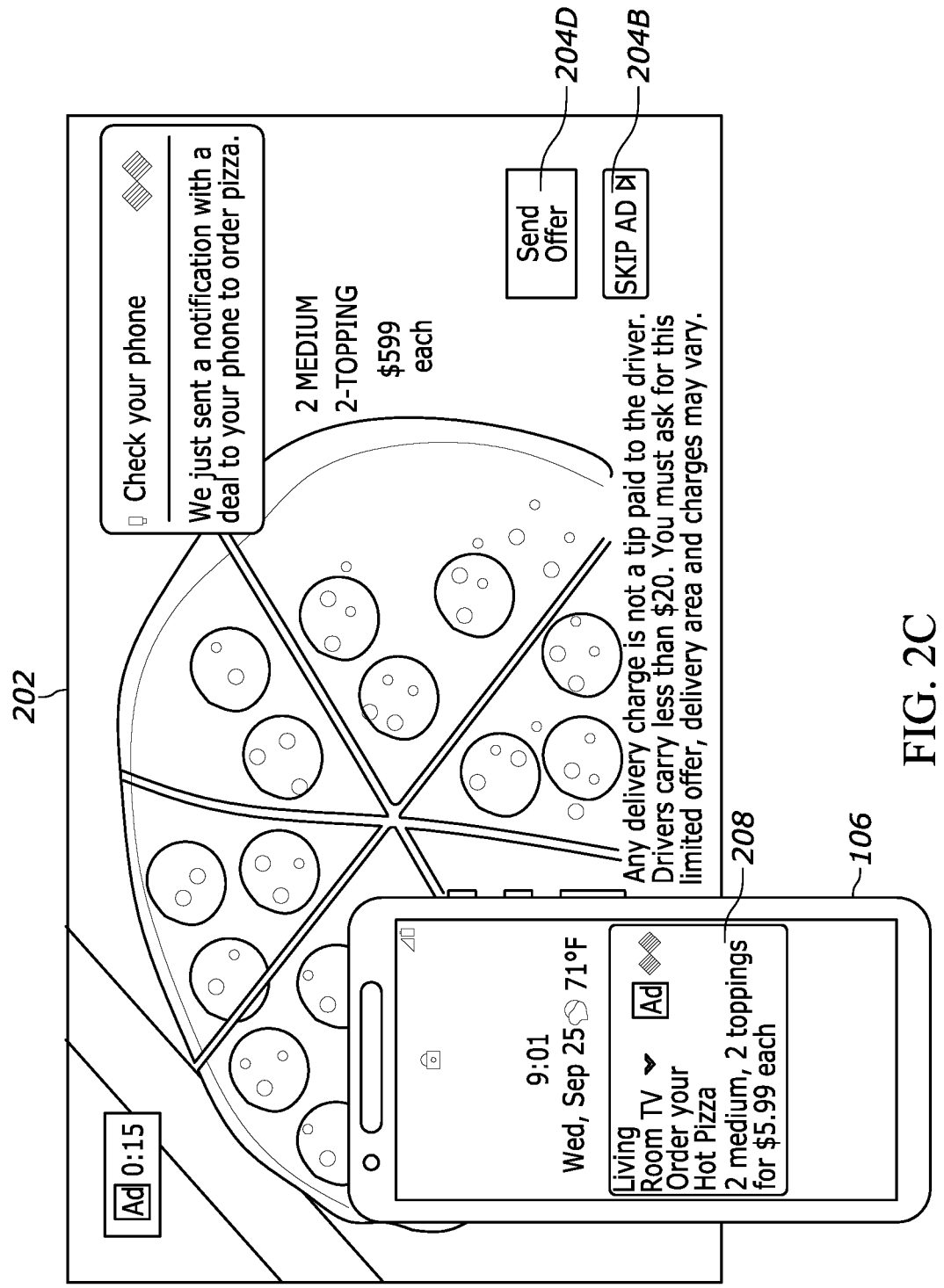

FIG. 2C illustrates another example of the media player application 115 of the media player device 102 providing third-party content 202 via the user interface 110 of the media player device 102. In the example of FIG. 2C, the third-party content 202 includes an advertisement for a pizza delivery offer available to be used with a pizza delivery mobile application. The third-party content 202 may include various selectable portions or icons 204D and 204B. The selectable icon 204D ("send offer") is associated with providing application content associated with the offer to a pizza delivery mobile application installed on the mobile computing device 106 associated with the user, and/or downloading the pizza delivery mobile application to the mobile computing device 106 and installing the pizza delivery mobile application on the mobile computing device 106, if the pizza delivery mobile application is not already installed. As discussed above, the selectable icon 204B is associated with skipping the third-party content 202. When a user selects the selectable icon 204D, the media player application 115 of the media player device 102 may send an indication of the selection (and an indication of the user's identification and/or identification of the user's mobile computing device 106) to the server 104, which may in turn send the application content associated with the offer to the pizza delivery mobile application installed on the mobile computing device 106 associated with the user. For instance, as shown in FIG. 2C, the mobile computing device 106 may display a notification 208 via the user interface 116 upon receiving the application content associated with the offer.

Figure 2D:
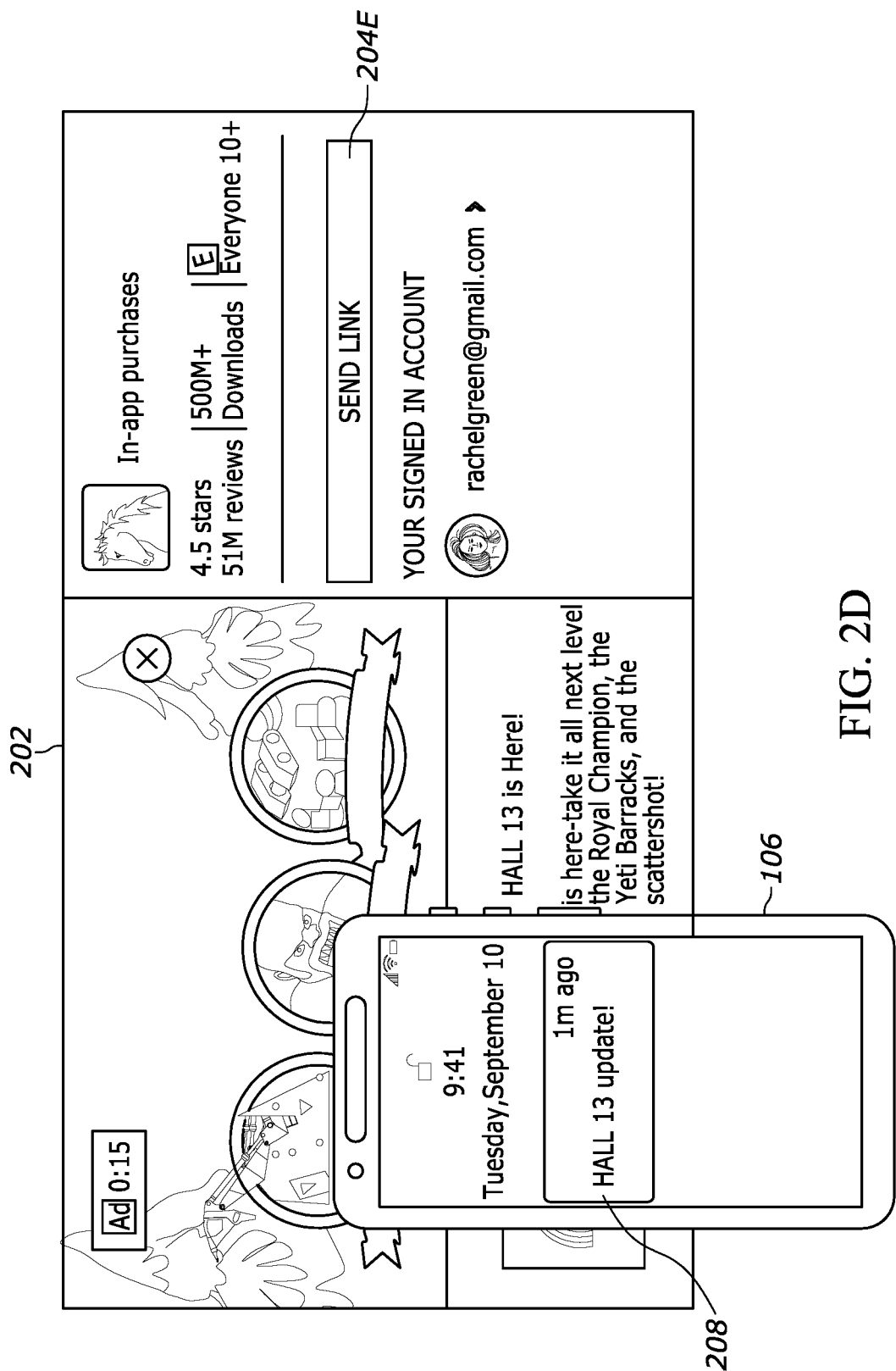

FIG. 2D illustrates another example of the media player application 115 of the media player device 102 providing third-party content 202 via the user interface 110 of the media player device 102. In the example of FIG. 2D, the third-party content 202 includes an advertisement for an update for a mobile gaming application. The third-party content 202 may include a selectable icon 204E. The selectable icon 204E ("send link") is associated with providing application content associated with the update to a mobile gaming application installed on the mobile computing device 106 associated with the user, and/or downloading the mobile gaming application to the mobile computing device 106 and installing the mobile gaming application on the mobile computing device 106, if the mobile gaming application is not already installed. When a user selects the selectable icon 204E, the media player application 115 of the media player device 102 may send an indication of the selection (and an indication of the user's identification and/or identification of the user's mobile computing device 106) to the server 104, which may in turn send the application content associated with the update to the mobile gaming application installed on the mobile computing device 106 associated with the user. For instance, as shown in FIG. 2D, the mobile computing device 106 may display a notification 208 via the user interface 116 upon receiving the application content associated with the update. In some examples, the mobile computing device 106 may download and/or install the update to the mobile gaming application without any additional input from the user. That is, in some examples, the mobile computing device 106 may download and/or install the update to the mobile gaming application sent by the server 104 without any user input being provided via the mobile computing device 106 itself (i.e., based only on user input provided via the media player device 102), or without any additional user input being provided via the mobile computing device 106 (in examples in which the user makes selections related to the media player device 102 via the mobile computing device 106).

Figure 2E:
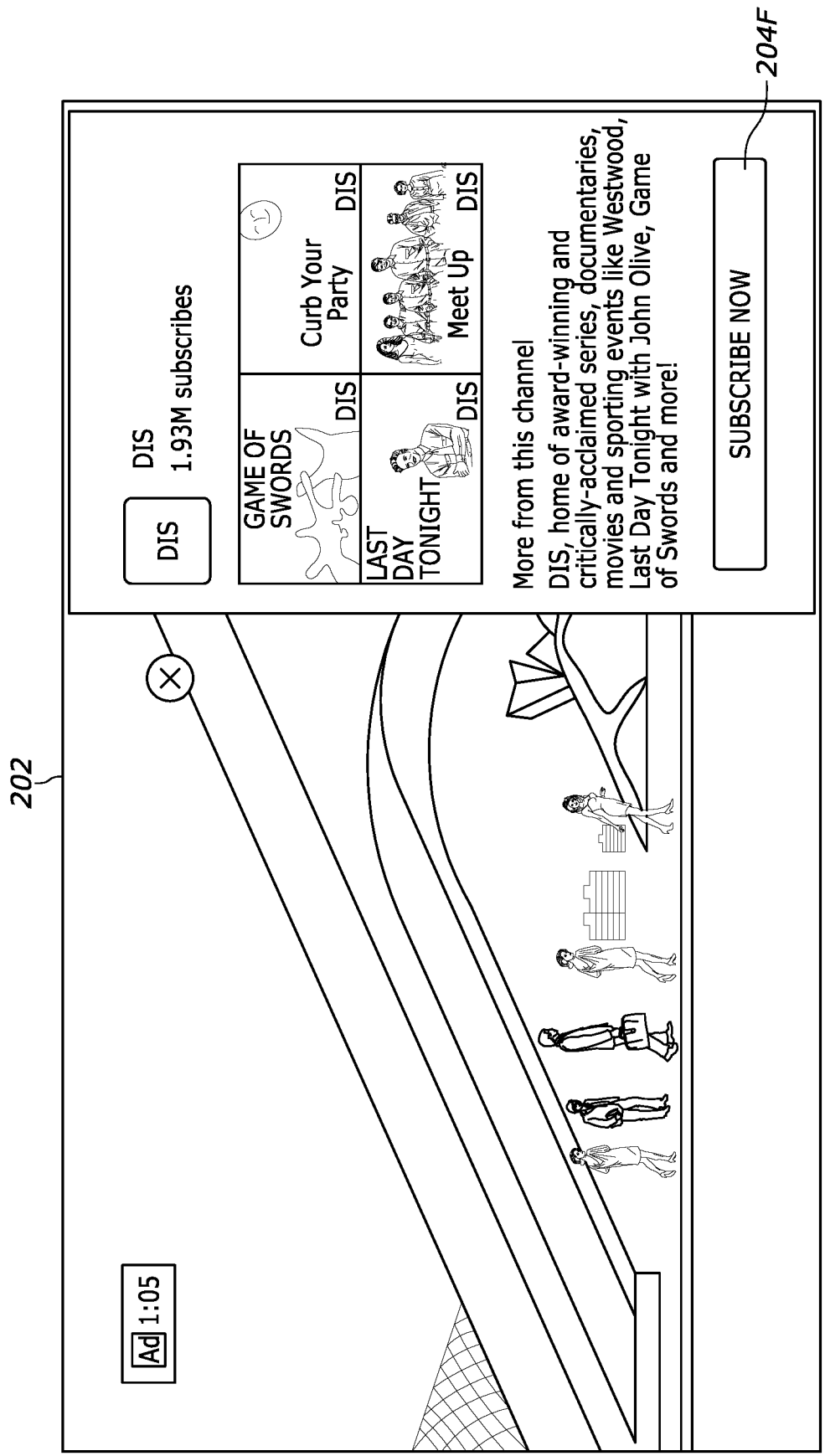

FIG. 2E illustrates another example of the media player application 115 of the media player device 102 providing third-party content 202 via the user interface 110 of the media player device 102. In the example of FIG. 2E, the third-party content 202 includes an advertisement and/or information about a subscription television streaming channel or service. The third-party content 202 may include a selectable icon 204F. The selectable icon 204F ("subscribe now") is associated with application content for activating a subscription to the television streaming channel or server via the media player application 115 or another application of the media player device 102. When a user selects the selectable icon 204F, the media player application 115 of the media player device 102 may send an indication of the selection to the server 104, which may in turn send the application content associated with the subscription to the media player application 115 or another application of the media player device 102.

Figure 2F:
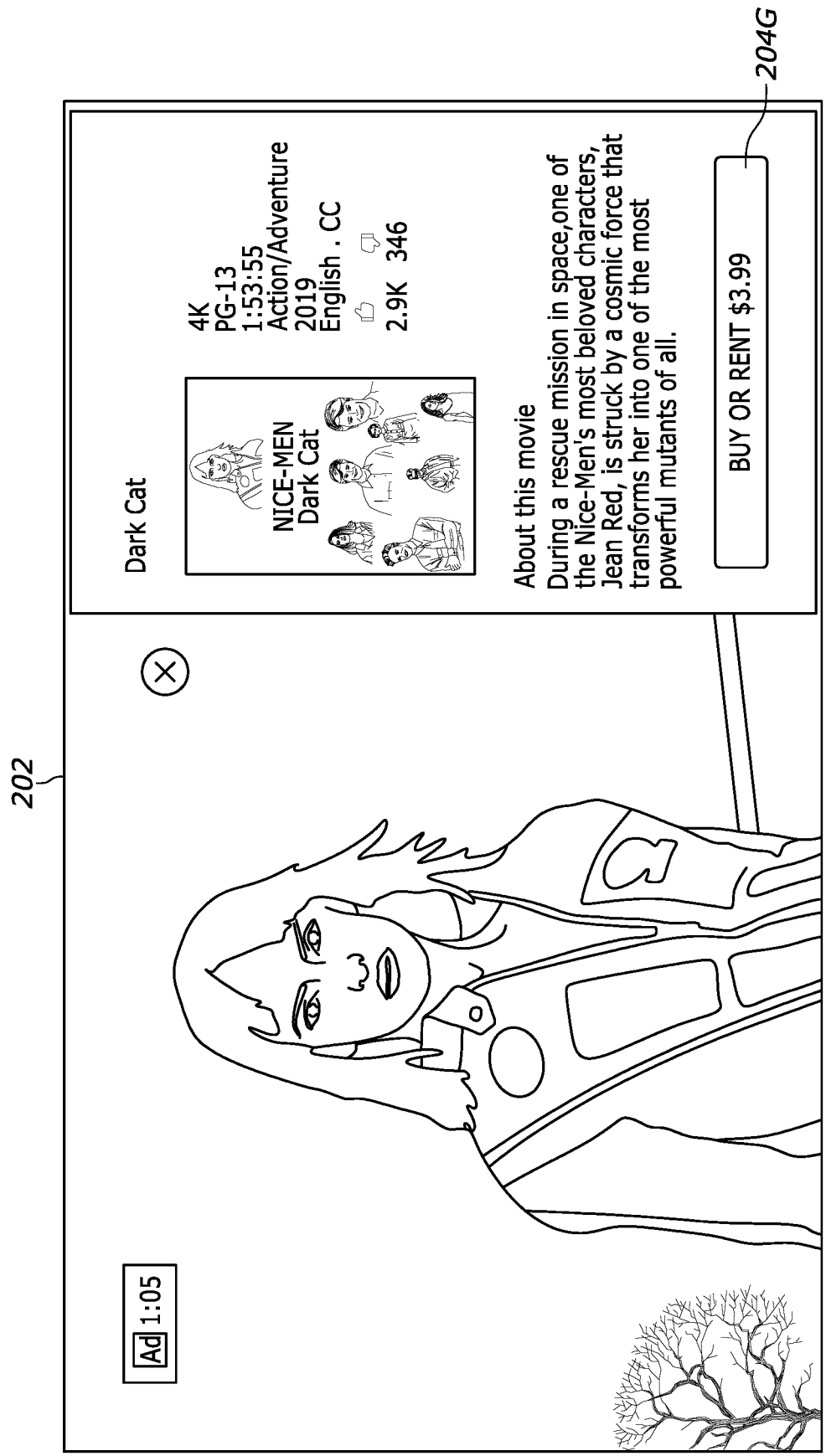

FIG. 2F illustrates another example of the media player application 115 of the media player device 102 providing third-party content 202 via the user interface 110 of the media player device 102. In the example of FIG. 2F, the third-party content 202 includes an advertisement and/or information about a movie or streaming television program (i.e., primary content). The third-party content 202 may include a selectable icon 204G. The selectable icon 204F ("buy or rent") is associated with application content for streaming the primary content via the media player application 115 or another application of the media player device 102. When a user selects the selectable icon 204G, the media player application 115 of the media player device 102 may send an indication of the selection to the server 104, which may in turn send the application content associated with streaming the primary content to the media player application 115 or another application of the media player device 102.

Example Method in a Media Player Device

Figure 3:
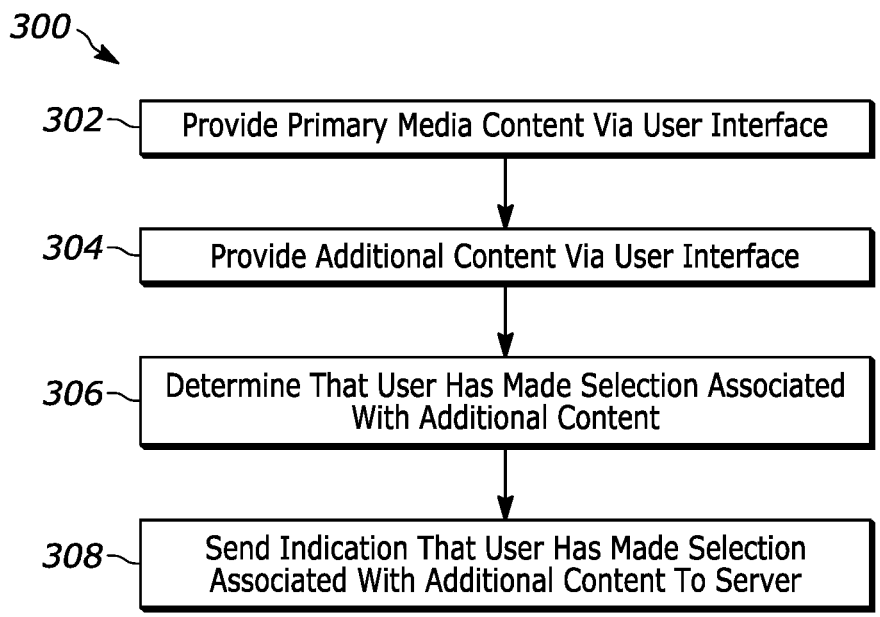
FIG. 3 illustrates a flow diagram of an example method for providing interactive content via multiple user devices implemented via a media player device.

FIG. 3 is a flow diagram of an example method 300 as may be used in the system 100 of FIG. 3, in accordance with some examples provided herein. One or more steps of the method 300 may be implemented as a set of instructions stored on a computer-readable memory (e.g., memory 114 of the media player device 102) and executable on one or more processors (e.g., processor 112 of the media player device 102). At block 302, primary media content may be provided. At block 304, third-party content may be provided. At block 306, a determination may be made that a user has made a selection associated with the third-party content. At block 308, an indication that the user has made the selection associated with the third-party content may be sent to a server.

Example Methods in a Server

Figure 4:
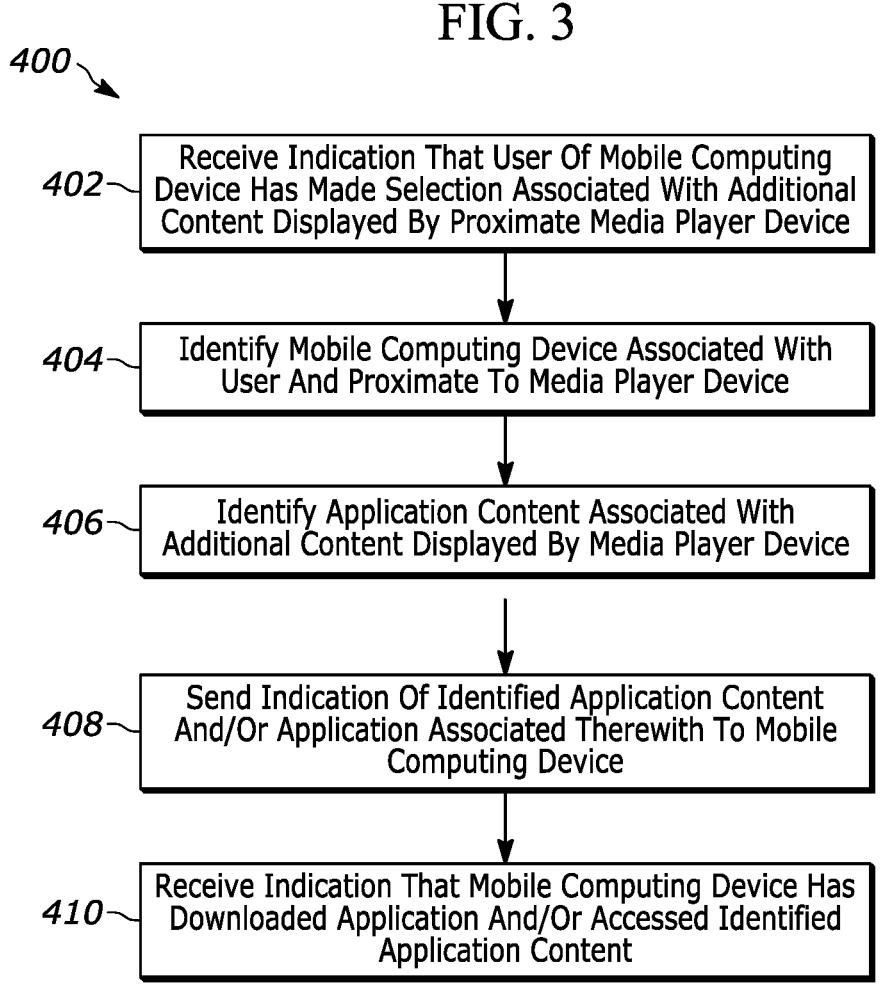
FIGS. 4 and 5 illustrate flow diagrams of example methods for providing interactive content via multiple user devices implemented via a server device.

FIG. 4 is a flow diagram of an example method 400 as may be used in the system 100 of FIG. 1, in accordance with some examples provided herein. One or more steps of the method 400 may be implemented as a set of instructions stored on a computer-readable memory (e.g., memory 124)

and executable on one or more processors (e.g., processors 122). At block 402, an indication that a user of a mobile computing device has made a selection associated with third-party content displayed by a proximate media player device may be received. At block 404, the mobile computing device associated with the user may be identified. At block 406, application content associated with the third-party content displayed by the media player device may be identified. At block 408, an indication of the identified application content, and/or an indication of an application associated with the identified application content, may be sent to the mobile computing device. At block 410, an indication that the mobile computing device has downloaded the identified application content, and/or the application associated with the identified application content, may be received.

Figure 5:
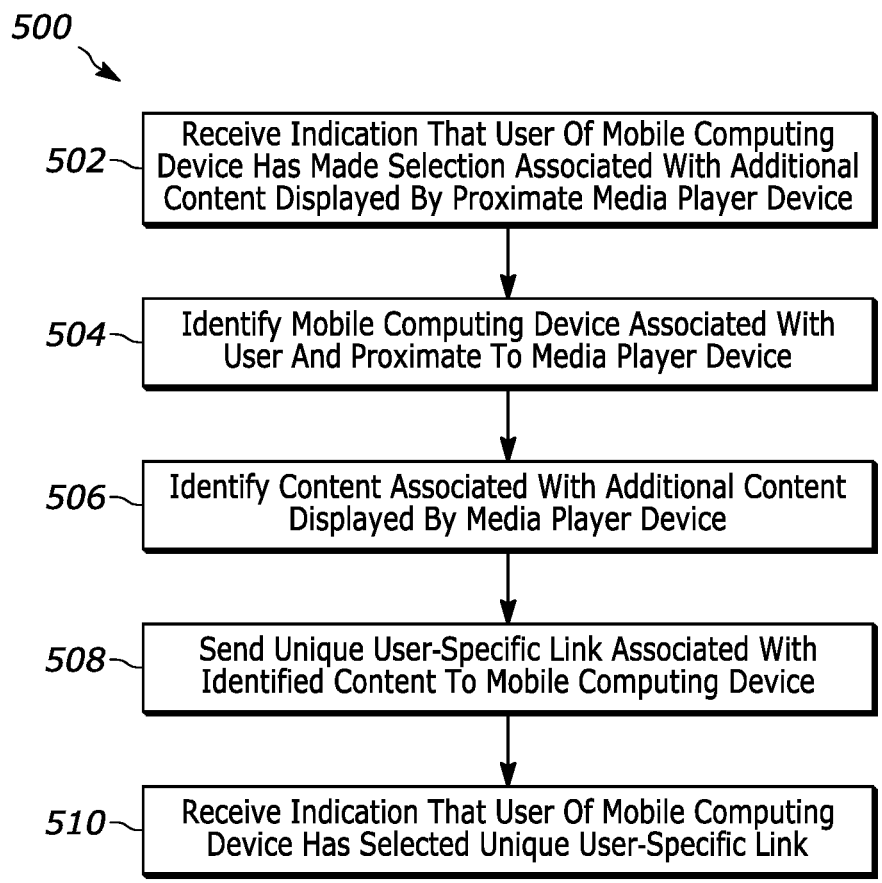

FIG. 5 is a flow diagram of an example method 500 as may be used in the system 100 of FIG. 1, in accordance with some examples provided herein. One or more steps of the method 500 may be implemented as a set of instructions stored on a computer-readable memory (e.g., memory 124) and executable on one or more processors (e.g., processors 122). At block 502, an indication that a user of a mobile computing device has made a selection associated with third-party content displayed by a proximate media player device may be received. At block 504, the mobile computing device associated with the user may be identified. At block 506, content associated with the third-party content displayed by the media player device may be identified. At block 508, an indication of a unique user-specific link associated with the identified content may be sent to the mobile computing device. At block 510, an indication that a user of the mobile computing device has selected the unique user-specific link may be received.

Example Methods in a Mobile Device

Figure 6:
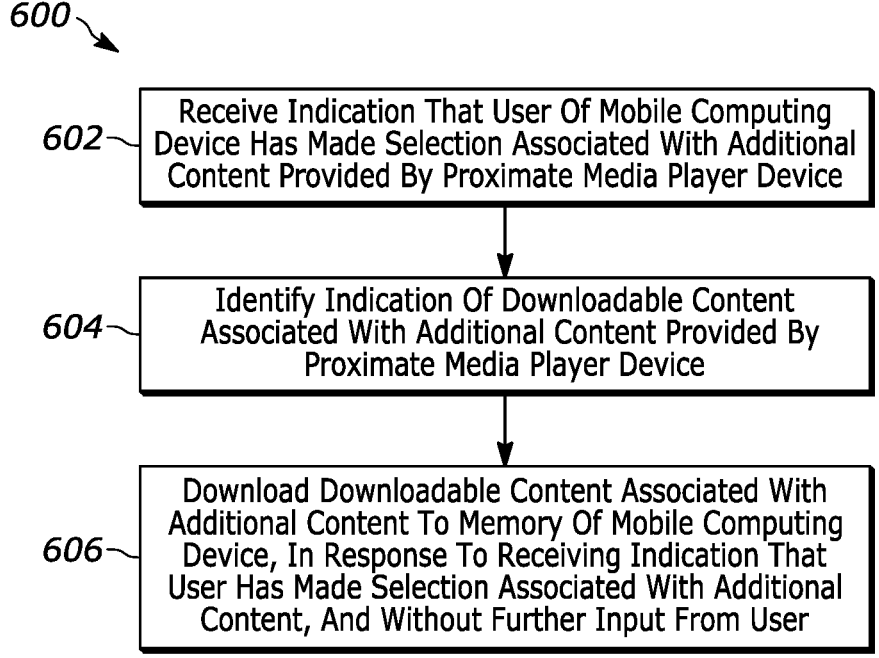
FIGS. 6 and 7 illustrate flow diagrams of example methods for providing interactive content via multiple user devices implemented via a mobile computing device.

FIG. 6 illustrates a flow diagram of an example method 600 as may be used in the system 100 of FIG. 1, in accordance with some examples provided herein. One or more steps of the method 600 may be implemented as a set of instructions stored on a computer-readable memory (e.g., memory 120 of the mobile computing device 106) and executable on one or more processors (e.g., processors 118 of the mobile computing device 106). At block 602, an indication that the user of a mobile computing device has made a selection associated with third-party content provided by a media player device may be received. At block 604, an indication of downloadable content associated with the third-party content provided by the media player device may be identified. At block 606, in response to receiving the indication that the user of the mobile device has made the selection associated with the third-party content provided by the media player device, and without further input from the user, the identified downloadable content associated with the third-party content provided by the media player device may be downloaded to a memory of the mobile computing device.

Figure 7:
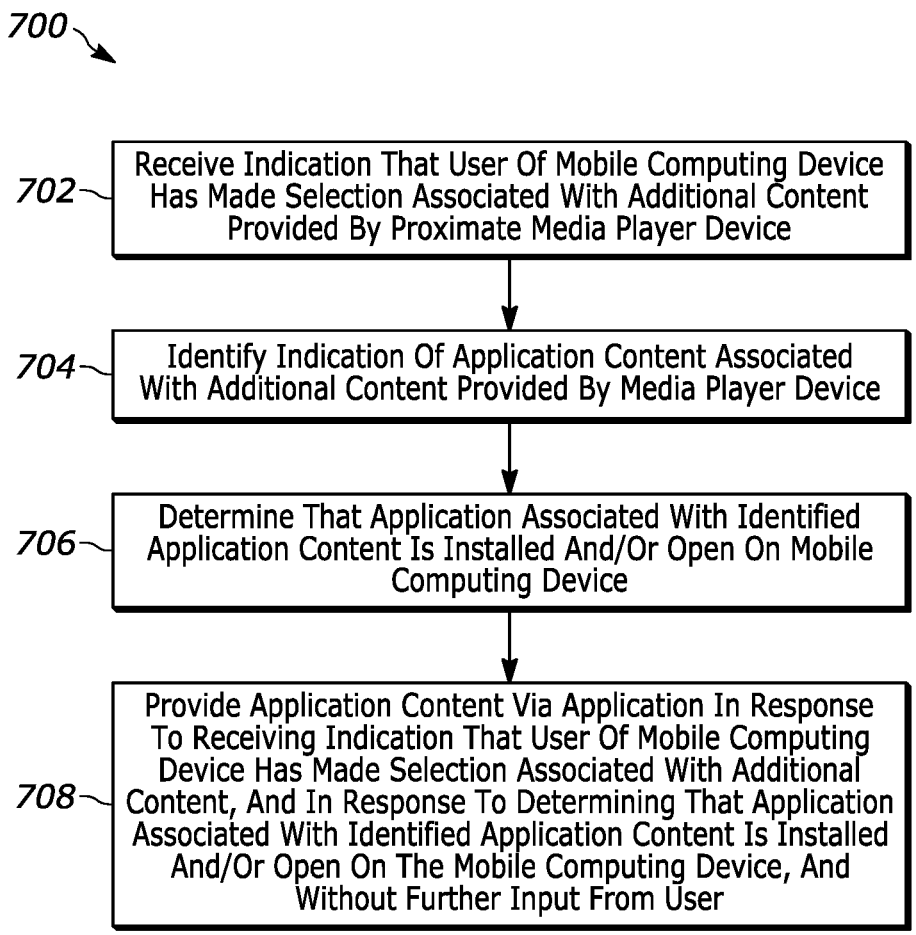

FIG. 7 illustrates a flow diagram of an example method 700 which may be used in the system 100 of FIG. 1, in accordance with some examples provided herein. One or more steps of the method 700 may be implemented as a set of instructions stored on a computer-readable memory (e.g., memory 120 of the mobile computing device 106) and executable on one or more processors (e.g., processors 118 of the mobile computing device 106). At block 702, an indication that the user of a mobile computing device has made a selection associated with third-party content provided by a media player device may be received. At block 704, an indication of application content associated with the third-party content provided by the media player device may be identified. At block 706, a determination may be made as to whether an application associated with the identified application content is currently one or more of installed or open on the mobile computing device. At block 708, in response to receiving the indication that the user of the mobile device has made the selection associated with the third-party content provided by the media player device, and in response to determining that the application associated with the identified application content is currently installed or open on the mobile computing device, and without further input from the user, the identified application content associated with the third-party content provided by the media player device may be provided by the application.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

A hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module in dedicated and permanently configured circuitry or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for initiating download of content, the method implemented in a mobile computing device associated with a user, the method comprising:
    receiving, by one or more processors of the mobile computing device, an indication of third-party content selected by the user via a media player device displaying the third-party content along with primary content, the media player device being proximate to the mobile computing device and distinct from the mobile computing device;
    identifying, by the one or more processors of the mobile computing device, downloadable content associated with the selected third-party content displayed by the media player device; and
    downloading, by the one or more processors of the mobile computing device, in response to receiving the indication and without further input from the user, the downloadable content to a memory of the mobile computing device.

2. The method of claim 1, further comprising:
    receiving, by the one or more processors of the mobile computing device, from a server, the indication of the downloadable content associated with the third-party content displayed by the media player device.

3. The method of claim 1, wherein downloading the downloadable content to the memory of the mobile computing device includes downloading a mobile-only application to the memory of the mobile computing device.

4. The method of claim 1, wherein downloading the downloadable content to the memory of the mobile computing device includes downloading a content item accessible by a mobile device application to the memory of the mobile computing device.

5. The method of claim 4, further comprising:
    determining, by the one or more processors of the mobile computing device, that the mobile device application is one or more of running or open on the mobile computing device, and wherein downloading the content item accessible by the mobile device application to the memory of the mobile computing device is based on the mobile device application being one or more of running or open on the mobile computing device.

6. The method of claim 1, further comprising:
    sending, by the one or more processors of the mobile computing device, to a server, an indication that the mobile computing device has downloaded the downloadable content.

7. A method of initiating download of content, the method implemented in a server and comprising:
    receiving, by one or more processors of the server, from a media player device, an indication of a selection made by a user, associated with third-party content displayed by the media player device;
    identifying, by the one or more processors of the server, a mobile computing device associated with the user and proximate to the media player device, the mobile computing device being distinct from the media player device;
    identifying, by the one or more processors of the server, downloadable content associated with the third-party content provided by the media player device;
    sending, by the one or more processors of the server, to the mobile computing device, an indication of downloadable content associated with the third-party content provided by the media player device; and
    receiving, by the one or more processors of the server, an indication that the mobile computing device has downloaded the downloadable content.

8. The method of claim 7, further comprising:
    sending, by the one or more processors of the server, to the mobile computing device, the downloadable content associated with the third-party content provided by the media player device.

9. The method of claim 8, wherein sending the downloadable content to the mobile computing device includes sending a downloadable mobile-only application to the mobile computing device.

10. The method of claim 8, wherein sending the downloadable content to the mobile computing device includes sending a content item accessible by a mobile device application to the mobile computing device.

11. A system for initiating download of content, the system comprising one or more processors of a mobile computing device and a non-transitory memory storing computer-readable instructions that, when executed by one or more processors of the mobile computing device, cause the one or more processors of the mobile computing device to:
    receive an indication of a selection, made by a user of a mobile computing device, associated with third-party content provided by a media player device, the media player device being proximate to the mobile computing device and distinct from the mobile computing device;
    identify an indication of downloadable content associated with the third-party content displayed by the media player device; and
    download, in response to receiving the indication of the selection and without further input from the user, the downloadable content to a memory of the mobile computing device.

12. The system of claim 11, wherein the computer-readable instructions, when executed by the one or more processors of the mobile computing device, further cause the one or more processors of the mobile computing device to:
    receive, from a server, the indication of the downloadable content associated with the third-party content displayed by the media player device.

13. The system of claim 11, wherein the computer-readable instructions, that when executed by the one or more processors of the mobile computing device, cause the one or more processors of the mobile computing device to download the downloadable content to the memory of the mobile computing device, include instructions that cause the one or more processors to download a mobile-only application to the memory of the mobile computing device.

14. The system of claim 11, wherein the computer-readable instructions, that when executed by the one or more processors of the mobile computing device, cause the one or more processors of the mobile computing device to download the downloadable content to the memory of the mobile computing device, include instructions that cause the one or more processors to download a content item accessible by a mobile device application to the memory of the mobile computing device.

15. The system of claim 14, wherein the computer-readable instructions, when executed by the one or more processors of the mobile computing device, further cause the one or more processors of the mobile computing device to:
   determine that the mobile device application is one or more of running or open on the mobile computing device, and wherein downloading the content item accessible by the mobile device application to the memory of the mobile computing device is based on the mobile device application being one or more of running or open on the mobile computing device.

16. The system of claim 11, wherein the computer-readable instructions, when executed by the one or more processors of the mobile computing device, further cause the one or more processors of the mobile computing device to:
   send, to a server, an indication that the mobile computing device has downloaded the downloadable content.

* * * * *